Aug. 19, 1941.  N. A. PALMGREN  2,252,977
ROLLER FOR ROLLER BEARINGS
Filed Feb. 24, 1940

INVENTOR
Nils Arvid Palmgren
BY Chas. Lyn Russell
HIS ATTORNEY

Patented Aug. 19, 1941

2,252,977

UNITED STATES PATENT OFFICE 2,252,977

ROLLER FOR ROLLER BEARINGS

Nils Arvid Palmgren, Goteborg, Sweden, assignor to Aktiebolaget Svenska Kullagerfabriken, Goteborg, Sweden, a corporation of Sweden Application February 24, 1940, Serial No. 320,535
In Sweden April 15, 1939

4 Claims. (Cl. 308—215)

The rollers of roller bearings are usually designed to be guided from a single flange, whereby as is the case in taper roller bearings or in a well-known design of self-aligning bearing one end face of the roller is held in contact with the flange due to the form of the rolling surfaces of the roller and of the roller races or alternatively the rollers are guided between two flanges as is the case in certain cylindrical roller bearings. It is necessary in order that the bearing may function satisfactorily, that the roller end surfaces cooperating with the flanges be accurately finished, which result is usually obtained by grinding. The height of the flanges cooperating with the roller is usually considerably less than the diameter of the roller and the roller therefore does not contact with the flange over its whole end face. It has therefore been proposed to simplify and shorten the grinding operation by providing the whole central part of the roller end surfaces with circular recesses, whereby the surface to be ground is concentrated to an annular band. This, however, carries with it certain disadvantages. By removing material from the centre of the end of the roller, the roller is weakened and the conditions of contact between the roller and the roller cage also becomes more unfavorable. Further the operation of checking the shape of the end surface of the roller is made more difficult, whether the surface is spherical, conical or plane. This checking operation is carried out with the aid of special templates. As the ground part of the surface is concentrated to a narrow annular band, the engagement between the template and the end of the roller will take place along short lines and a deviation from the correct shape can therefore be observed only with considerable difficulty.

The present invention relates to shaping the roller ends in a manner, which simultaneously avoids the above mentioned disadvantages while making it possible to attain substantially the same saving in time required for grinding the end of the roller, as was obtained with the prior suggestion of providing the end of the roller with a central recess. The invention is therefore characterized substantially thereby that the end surface of the roller has an annular recess substantially concentric with the axis of the roller and located under or inside of the plane or profile generated in grinding the contact surface of the end of the roller.

The invention is illustrated in the accompanying drawing as applied to various forms of rollers.

Figure 1:
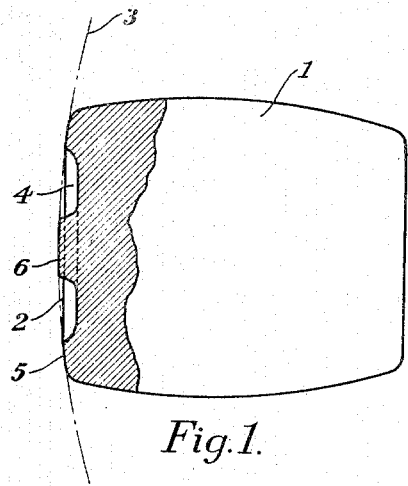
Figure 1 shows a side view partly in section of a roller for a self-aligning bearing in which the contact surface of the end of the roller is spherical.
Figure 2:
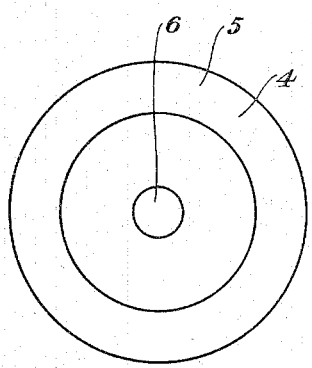
Figure 2 shows an end view of the same roller.

In Figure 1 the numeral 1 designates the roller of a self-aligning roller bearing. The end surface 2 of the roller is to be ground so that the surface engaging the flange comprises part of a spherical surface the curvature of which is indicated by the dot and dash line 3. The end surface 2 of the roller is provided with an annular recess 4 located under or inside of the profile 3. The surfaces which are thus ground during the finishing operation are the remaining annular surface 5 and the smaller circular surface 6. It is apparent that the amount of material to be removed during grinding and which is proportionate to the area of the surface to be ground is considerable less in a roller formed in this manner than in a roller which must be ground over its whole end surface, since grinding does not have to take place over that part of the surface corresponding to the recess 4. The reduction in time is nearly as great as with the roller previously suggested since the area of the circular surface 6 is comparatively small relative to the area of the end of the roller taken as a whole. However, by permitting the surface 6 to remain, the advantages previously mentioned are attained. From Figure 1 it is further apparent, that when checking the surface with a template having a profile corresponding to the arc 3 contact is obtained at three different places, namely with the annular surface 5 at each end of the diameter and also with the surface 6 instead of, as otherwise if the recess extends over the whole central portion of the end of the roller, only at two relatively narrow places namely against the annular surface 5 at each side of the roller. It is therefore possible to check much more effectively that the roller end attains the correct curvature.

Figure 3:
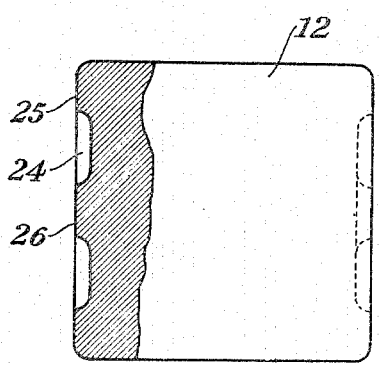
Figure 3 shows a side view partly in section of a cylindrical roller bearing roller, having plane end surfaces, and Figure 4, finally, shows on a larger scale a portion of a roller according to a modified form of the invention.

Figure 3 shows a cylindrical roller, which is provided with annular recesses 24 at both ends since this roller is intended to be guided between two flanges. The roller ends 25 and 26 are otherwise plane.

Figure 4:
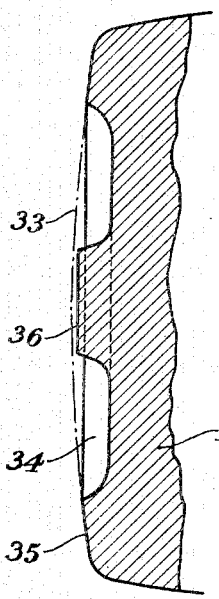

Figure 4 shows on a larger scale a modification of the roller end shown in Figure 1. This modification may for example be formed by grinding the central portion 36 plane for attaining still better engagement with the cage. In this case the circular central surface 36, left by forming the annular recess 34, will be located somewhat inside of the profile 33 attained when finishing the contact surface 35. The roller will hereby be only slightly weakened as compared with the roller shown in Figure 1. The grinding of the portion 36 to a plane located under the profile 33 can be carried out either before or after the grinding of the surface 35 and before or after the checking operation. In the latter case the surface 36 can also be made use of in checking the profile of the surface 35 as described above.

The above described forms of the invention are intended only as examples. It is apparent that the invention can be carried out independent of the shape of the roller and independent of the form of the profile of the contact surface of the end of the roller.

Having thus described my invention, I claim and desire to secure by Letters Patent:

1. A roller bearing roller having at least one finished end surface for engagement with a flange, the end surface also having an annular recess located inwardly of said engaging surface and preferably substantially concentric with the axis of the roller and located under the profile of the engaging surface of the end of the roller.

2. A roller bearing roller having at least one spherical end surface for engagement with a flange, the end surface also having an annular recess located inwardly of said engaging surface and preferably substantially concentric with the axis of the roller and located under the profile spherical end surface of the roller and a central surface located on the same sphere.

3. A roller bearing roller having at least one substantially flat end surface for engagement with a flange, the end surface also having an annular recess preferably substantially concentric with the axis of the roller and located under the profile generated upon finishing the engaging surface of the end of the roller and a central part inside the recess having its surface located on the same plane as the flat engaging surface.

4. A roller bearing roller having at least one finished end surface for engagement with a flange, the end surface also having an annular recess preferably substantially concentric with the axis of the roller and located under the profile generated upon finishing the engaging surface of the end of the roller and a central part having its surface located under the profile of the said end surface but above that of the said annular recess.

NILS ARVID PALMGREN.